United States Patent [19]

Akashi

[11] Patent Number: 4,786,932

[45] Date of Patent: Nov. 22, 1988

[54] CAMERA HAVING A FOCUS STATE DETECTION DEVICE

[75] Inventor: Akira Akashi, Yokohama, Japan

[73] Assignee: Canon Kabushiki Kaisha, Tokyo, Japan

[21] Appl. No.: 138,969

[22] Filed: Dec. 29, 1987

[30] Foreign Application Priority Data

Jan. 12, 1987 [JP] Japan ..................... 62-4576

[51] Int. Cl.$^4$ .............................................. G03B 3/10
[52] U.S. Cl. ................................................... 354/402
[58] Field of Search ................. 354/400, 402, 405, 409

[56] References Cited

U.S. PATENT DOCUMENTS

| | | | |
|---|---|---|---|
| 4,314,748 | 2/1982 | Kawabata et al. | 354/409 |
| 4,416,523 | 11/1983 | Kawabata | 354/402 |
| 4,459,006 | 7/1984 | Sakai et al. | 354/406 |
| 4,472,040 | 9/1984 | Kawabata | 354/406 |
| 4,500,188 | 2/1985 | Kitagishi et al. | 354/406 |
| 4,617,459 | 10/1986 | Akashi et al. | 250/201 |
| 4,671,640 | 6/1987 | Akada et al. | 354/402 |
| 4,733,262 | 3/1988 | Taniguchi et al. | 354/402 |

*Primary Examiner*—W. B. Perky
*Attorney, Agent, or Firm*—Fitzpatrick, Cella, Harper & Scinto

[57] ABSTRACT

A camera having a focus state detection device, or more particularly a camera which effects searching to escape from disability of focus state detection by reciprocating a lens at least one reciprocation when the camera cannot detect the focus state, is disclosed. Once the searching has been effected, further searching is inhibited until in-focus or near in-focus state is attained in the focusing operation.

9 Claims, 9 Drawing Sheets

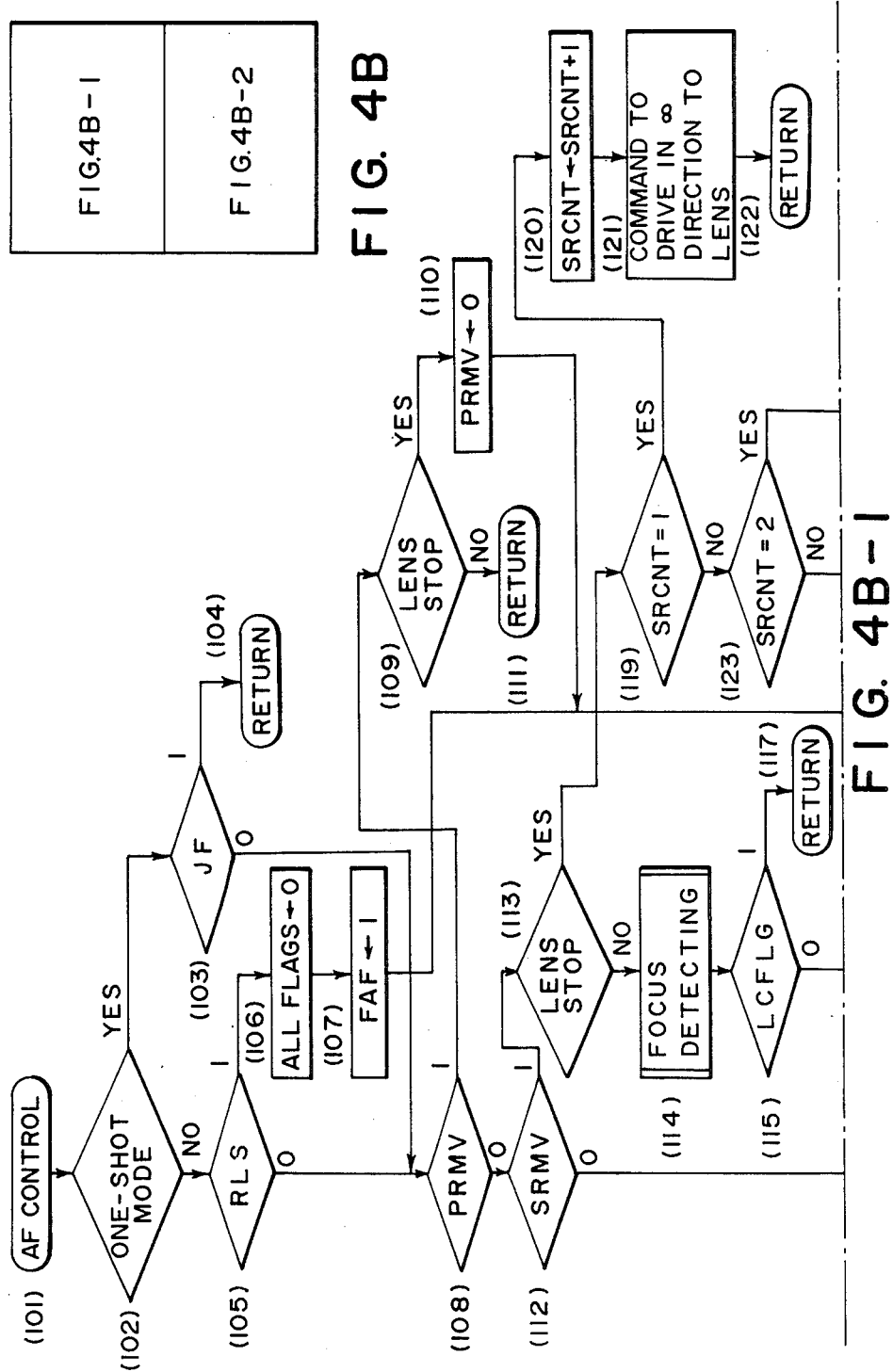

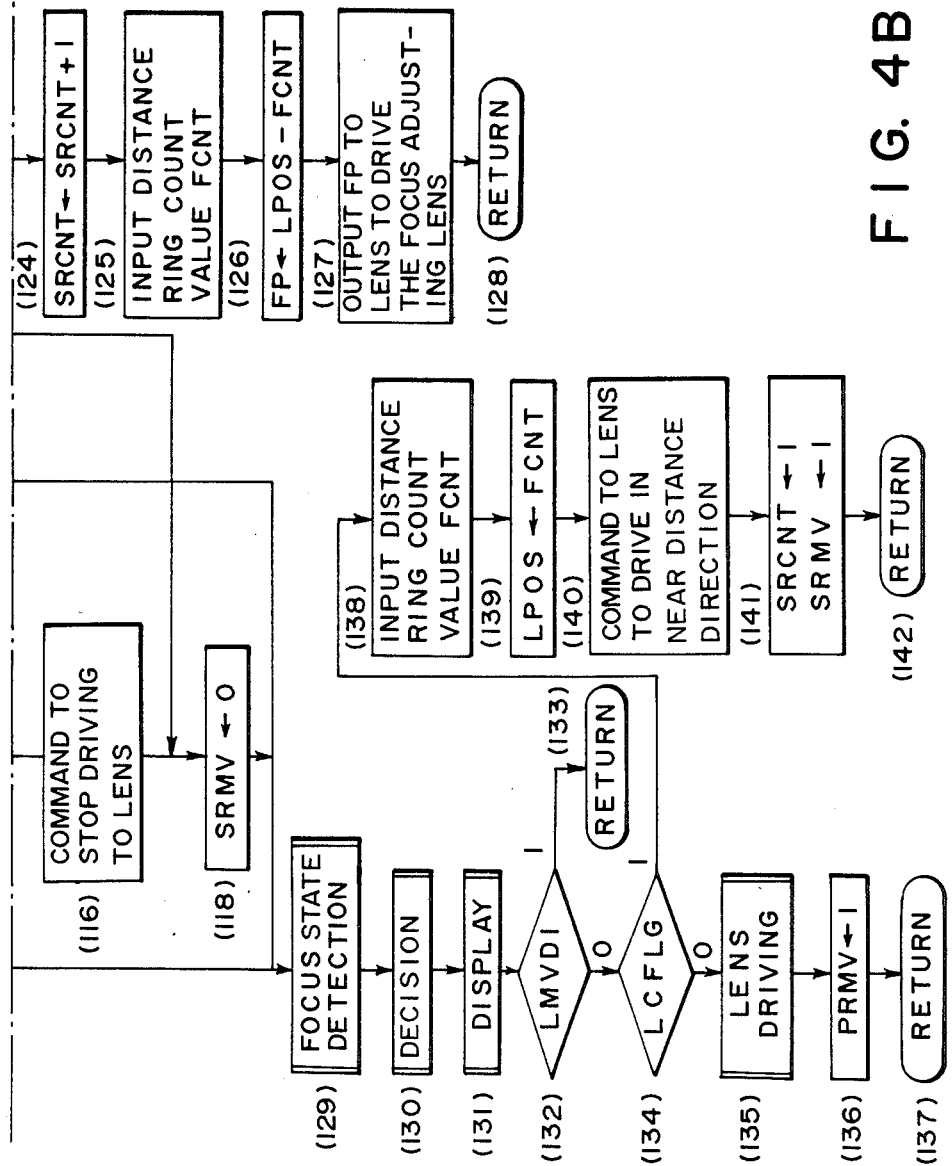

CAMERA HAVING A FOCUS STATE DETECTION DEVICE

BACKGROUND OF THE INVENTION

1. Field of the Invention

The present invention relates to a focus adjustment device of a cemera.

2. Related Background Art

In one of known focus adjustment devices of cameras, an exit pupil of an imaging lens is split into two areas by a focus state detecting optical system, two object images formed by light beams passing through the respective pupil areas are sensed by photo-electric transducer element arrays (for example, CCD sensor arrays), a focus status of the imaging lens is detected based on the outputs of the arrays, and the imaging lens is driven in accordance with the detection result.

In the in-focus state detection operation, a high precision focus state detection may be attained if a contrast of an object image is sufficiently high, but the focus state may not be detected when the contrast is low. In order to solve this problem, a so-called search operation in which the imaging lens is driven independently from the detection result with an expectation of rise of the contrast of the object is frequently used, because the low contrast is caused by an actual low contrast of the object or a large defocus distance of the imaging lens.

In the search operation, the imaging lens is usually driven from its nearest end to an infinite end of a distance ring of the imaging lens one reciprocation. Since this takes a substantial time for a telescope lens, the searching is effected only one and the searching is inhibited in the subsequent focus-state detection operation. If the searching is effected each time a low contrast is detected in the course of continuous focus adjustment, the searching will be continuously effected under a circumstance where the low constract state continues, and photographing may not be effected forever. Accordingly, if the low contrast is detected after one search operation, an indication such as disable to detect a focus state is displayed and the searching is inhibited.

By the above approach, the continuous searching can be prevented, but if the low contrast state disappears after the searching and the lens is ready to be driven to the in-focus position, the searching is not effected even the low contrast subsequently appears. As a result, the focus adjustment is time-consuming under such a circumstance.

SUMMARY OF THE INVENTION

It is an object of the present invention to provide a focus state detection device which effects searching once in a circumstance where detection of a focus state is not possible, inhibits further searching until in-focus or near in-focus state is attained in a subsequent focus adjustment operation, and permits the searching when the in-focus or near in-focus state is attained after the one previous searching and thereafter the detection of the focus state is disabled.

Other objects of the present invention will be apparent from the description of the preferred embodiments.

BRIEF DESCRIPTION OF THE DRAWINGS

FIGS. 4A–4F illustrate a program of the operation of the camera in accordance with the present invention.

DETAILED DESCRIPTION OF THE PREFERRED EMBODIMENTS

Figure 1:
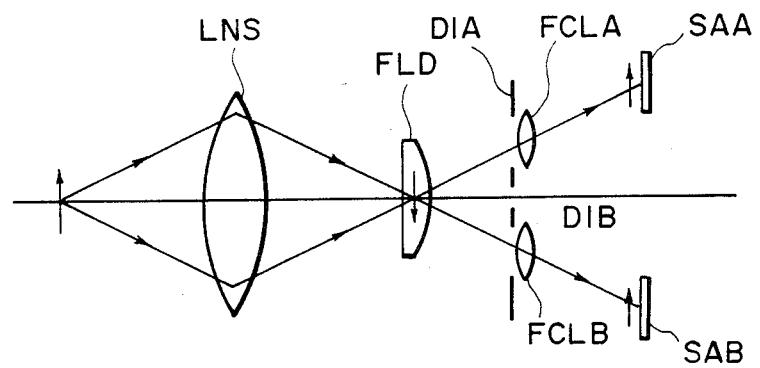
FIG. 1 shows an optical principle of a focus state detection device of the present invention.

Referring to FIG. 1, a principle of in-focus state detection in the present invention is first explained. A field lens FDL is arranged in a common optical axis with an imaging lens LNS whose focus state is to be detected. Two secondary focusing lenses FCLA and FCLB are arranged behind the field lens FLD symmetrically with the optical axis. Sensor arrays SAA and SAB are arranged behind thereof. Diaphragms DIA and DIB are arranged near the secondary focusing lenses FCLA and FCLB. The field lens FLD substantially focuses an exit pupil of the imaging lens LNS onto pupil planes of the secondary focusing lenses FCLA and FCLB. As a result, light beams going into the secondary focusing lenses FCLA and FCLB are ejected from non-overlapping equi-area areas on the exit pupil plane of the imaging lens LNS corresponding to the secondary focusing lenses FCLA and FCLB. When a space image formed near the field lens FLD is refocused onto the planes of the sensor arrays SAA and SAB by the secondary focusing lenses FCLA and FCLB, the positions of the two images on the sensor arrays SAA and SAB change in accordance with the displacement of the space image in the direction of the optical axis. Accordingly, the focus state of the imaging lens LNS can be detected by detecting the displacement of relative positions of the two images on the sensor arrays.

Figure 2:
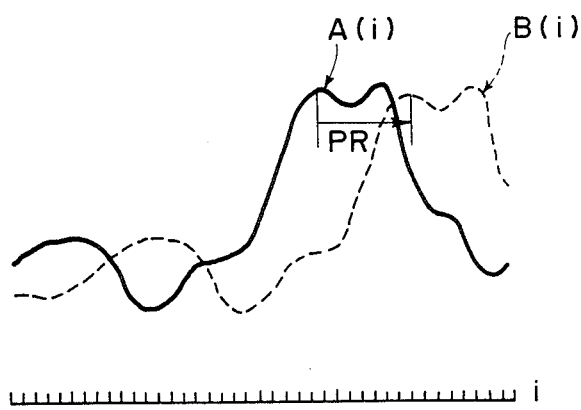
FIG. 2 shows waveforms of outputs of sensors SAA and SAB of FIG. 1.

FIG. 2 shows photo-electric converted outputs of the two images formed on the sensor arrays SAA and SAB. The output of SAA is denoted by $A(i)$ and the output of SAB is denoted by $B(i)$. In the present example, the number of pixels of the sensor is $40 (i=0, \ldots, 39)$.

A signal processing method for detecting an image deviation PR based on the image signals $A(i)$ and $B(i)$ is disclosed in Japanese Laid-Open Patent Application Nos. 142306/1983, 107313/1984, 101513/1985 or Japanese Patent Application No. 160824/1986, all filed in the name of the assignee of the present invention.

The imaging lens can be driven to an in-focus state by adjusting the focus of the imaging lens in accordance with the image deviation derived by the methods described in those applications.

Figure 3:
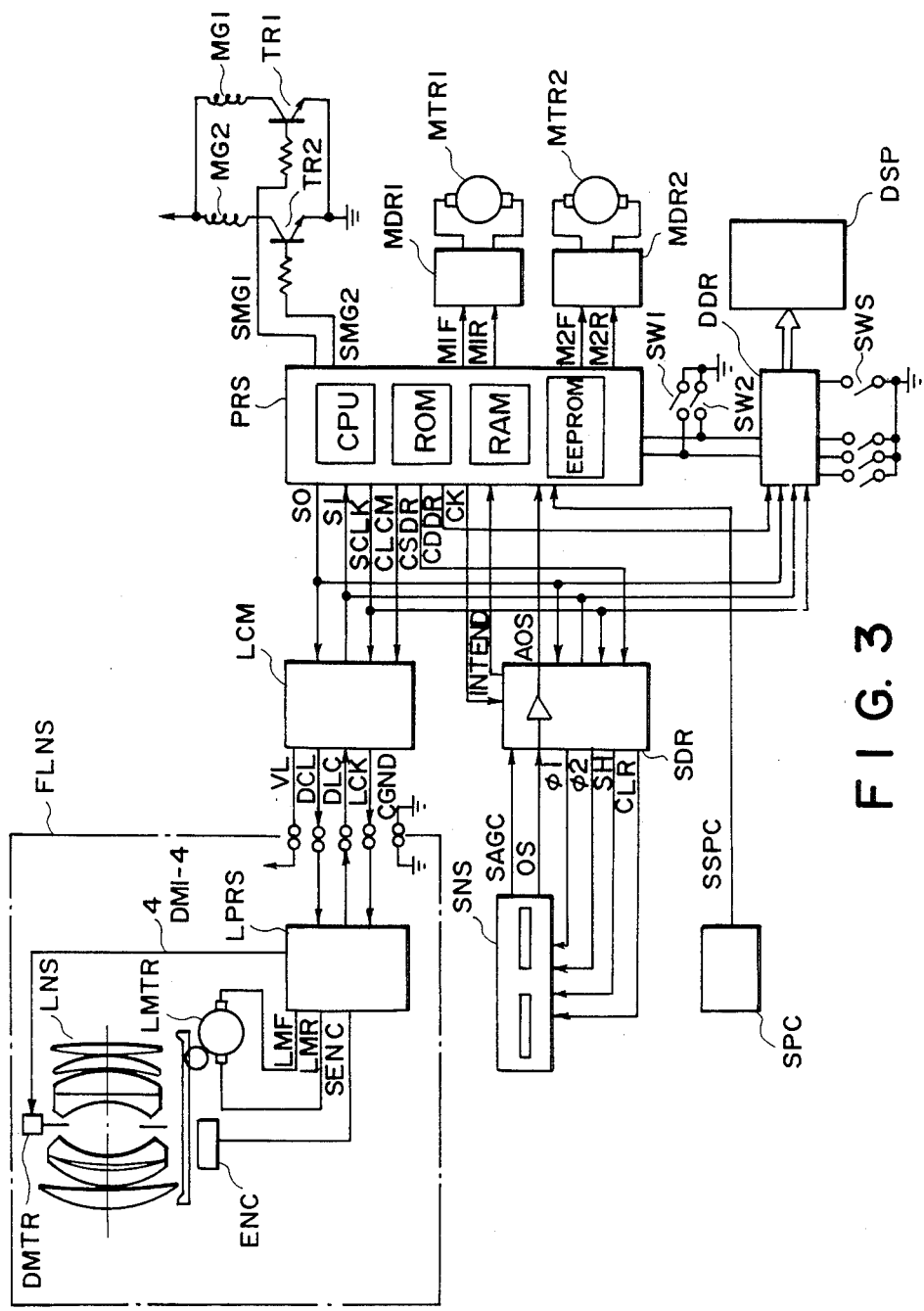
FIG. 3 shows a circuit diagram of one embodiment of a camera in accordance with the present invention.

FIG. 3 shows a circuit diagram of an embodiment of a camera having an automatic focusing device of the present invention.

In FIG. 3, PRS denotes a control unit of the camera which may be a one-chip microcomputer having CPU, ROM, RAM, EEPROM (electrically erasable programmable ROM) and A/D conversion function and which carries out camera functions such as automatic exposure control function, automatic focus state detection function and film wind/rewind function in accordance with a camera sequence program stored in the ROM. The EEPROM is one of non-volatile memories in which various adjustment data are written during the steps.

The computer PRS communicates with peripheral circuits and the lens by communication signals SO, SI and SCLK and controls the operations of those circuits and lens.

SO denotes a data signal supplied by the computer PRS, SI denotes a data signal applied to the computer PRS, and SCLK denotes a synchronization signal to the signals SO and SI.

LCM denotes a lens communication buffer circuit which supplies a lens power supply VL to the lens when the camera is in operation, and functions as a buffer for the camera-lens communication when a signal CLCM from the computer PRS is high level (H).

When the computer PRS renders CLCM the high level H and sends out data from SO in synchronism with SCLK, the buffer circuit LCM supplies buffer signals LCK and DCL of SCLK and SO to the lens through camera-lens contacts. It also sends out, as SI, the buffer signal of the signal DLC supplied from the lens, and the computer PRS receives the lens data from the signal SI in synchronism with SCLK.

SDR denotes a driver for an in-focus status detecting line sensor SNS. It is activated when a signal CSDR is H and it is controlled by PRS by the signals SO, SI and SCLK.

CK denotes a clock signal for generating CCD driving clocks $\phi 1$ and $\phi 2$, and INTEND denotes a signal which informs the end of storage operation to the computer PRS.

An output signal OS of the sensor SNS is a time-sequential image signal (stored image signals of respective pixels of images sensed by pixels of the sensor arrays SAA and SAB of the sensor) which is in synchronism with the clocks $\phi 1$ and $\phi 2$. It is amplified by an amplifier in SDR and supplied to the computer PRS as a signal AOS. The computer PRS receives the signal AOS through an analog input terminal, A/D converts it by an internal A/D conversion function in synchronism with CK, and stores it at predetermined addresses of the RAM.

SAGC denotes an output signal of the sensor SNS which is an AGC controlling sensor output of the sensor SNS. It is supplied to a driver SDR to control storage of the image signals in the sensor arrays SAA and SAB of the sensor SNS. A series of operations of the circuit SDR will be explained later.

SPC denotes an exposure controlling photo-sensor which senses light received through the lens. An output SSPC thereof is applied to the analog input terminal of the computer PRS and then it is A/D converted and used for automatic exposure control (AE).

DDR denotes a switch sense and display circuit. It is activated when the signal CDDR is H and it is controlled by the computer PRS by SO, SI and SCLK. It switches display of a camera display unit DSP in accordance with the data sent from the computer PRS, and informs to the computer PRS the on/off states of switches SW5 including a release button (interlocked to switches SW1 and SW2) and mode selection buttons.

MDR1 and MDR2 denote drivers for film feed and shutter charge motors MTR1 and MTR2. They are driven forward and backward by signals M1F, M1R, M2F and M2R. MG1 and MG2 denote shutter leading and trailing curtain starting magnets which are energized through amplifying transistors TR1 and TR2 by signals SMG1 and SMG2 and the shutter control is effected by the computer PRS.

The switch sense and display circuit DDR, motor drivers MDR1 and MDR2 and shutter control are not directly related to the present invention and hence detailed explanation thereof is omitted.

A signal DCL applied to a driver LPRS in the lens in synchronism with the signal LCK is an instruction from the camera to the lens FLNS. The operation of the lens for the instruction has been predetermined.

LPRS decodes the instruction in a predetermined procedure, controls the focus adjustment and diaphragm control, and outputs various lens parameters (open F number, focal distance, coefficient of defocus distance to drive distance) from the output DLC.

In the present embodiment, a single lens which is driven in its entity is shown. When a focus adjust command is sent from the camera, the focus adjusting motor LMTR is driven by the signals LMF and LMR in accordance with the amount and direction of drive sent from the camera to move the optical system in the direction of optical axis to adjust the focus. The movement of the optical system is monitored by using a pulse signal SENC from an encoder ENC which comprises a pulse plate which is rotated as the optical system is moved and produces pulses corresponding in number to the movement of the optical system. The pulses are counted by a counter in LPRC, and when the predetermined movement is completed, the signals LMF and LMR are rendered L to brake the motor LMTR.

When a diaphragm control signal is sent from the camera, a diaphragm driving stepping motor DMTR is energized in accordance with the number of steps of diaphragm sent from the camera.

The operation of the camera thus constructed is now explained with reference to flows of FIG. 4.

When a power switch (not shown) is actuated, power is supplied to the microcomputer PRS so that PRS starts the execution of the sequence program stored in the ROM.

Figure 4A:
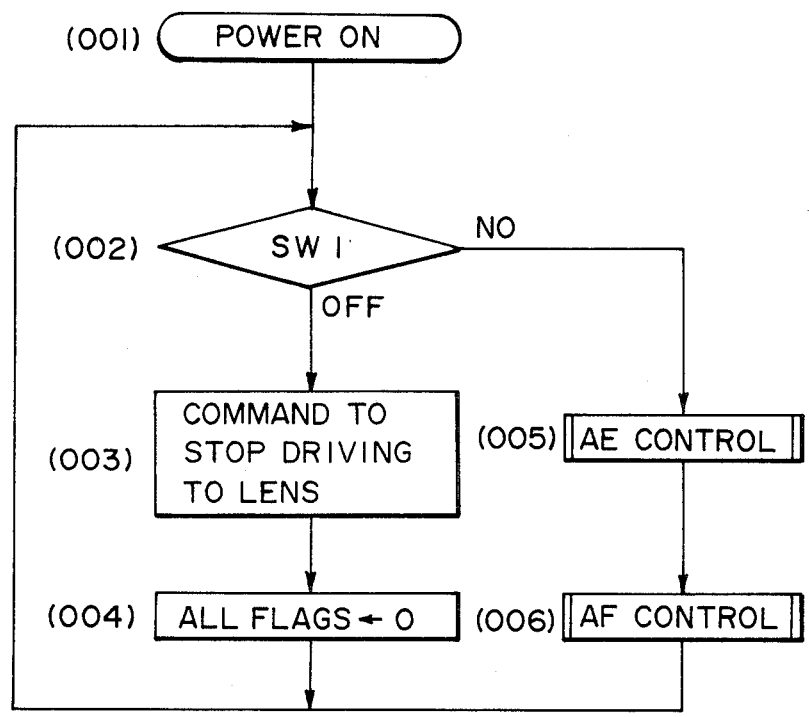

FIG. 4A shows a flow chart of an overall flow of the program. When the execution of the program is started, a status of a switch SW1 which is turned on in a first stroke of the release button is detected in a step (002). If the switch SW1 is off, the computer PRS renders CLCM to H in a step (003) and the circuit LCM sends out, as the signal SO, a command to stop drive to the lens. In the next step (004), all control flags and variables set in the RAM of PRS are cleared. The steps (002), (003) and (004) are repeatedly carried out until the switch SW1 is turned on or the power switch is turned off. Even during the drive of the lens, the lens drive is stopped if SW1 is turned off. The state of the switch SW1 is detected by rendering the signal CDDR to H to select the circuit DDR, supplying the detect command for the switch SW1 to the circuit DDR as the signal SO, and supplying the state signal of the switch SW1 detected by the circuit DDR to the computer PRS as the signal SI. When SW1 is turned on, the process proceeds to a step (005). The step (005) is an AE control subroutine which executes a series of camera operations such as light measurement, exposure control, shutter charging after exposure and film winding. Since the AE control subroutine is not directly related to the present invention, detailed explanation thereof is omitted and only the outline of the functions of this subroutine is described.

During on state of SW1, the AE control subroutine is executed and the light measurement, exposure control and display are carried out. When the switch SW2 is turned on in a second stroke of the release button (not shown), the release operation is started by an interrupt function of the micro-computer PRS, the diaphragm or shutter speed is controlled in accordance with the exposure determined by the exposure control, and after the exposure, the shutter is charged and the film is wound to complete one frame of photographing.

The camera of the present embodiment has two modes, one-shot and servo as an AF mode. When the AF mode is the one-shot mode, once the in-focus state is attained, the focus adjustment is not effected again until the switch SW1 is turned off, and the release is not permitted until the in-focus state is attained.

In the servo mode, the focus adjustment is effected even after the in-focus state has been attained, and the release is permitted any time without regard to the result of the focus detection. Accordingly, the interruption is permitted in the one-shot mode after the in-focus state has been attained, and permitted any time in the servo mode but inhibited after the release operation and again permitted after the execution of the AF control subroutine in the next step (006). The one-shot servo is selected by a mode selection switch (not shown).

As described above, the release operation is carried out upon turning on of the switch SW2. When the switch SW2 is kept on after the completion of one-frame photographing, it is determined that the AE control has been terminated and the process returns. The operation which takes place when the switch SW2 is kept on is explained. In the one-shot mode, the release operation is not permitted until the in-focus state is attained, when the release operation is permitted and one-frame photographing is carried out. Thereafter, no focus adjustment is carried out because of the one-shot mode and the next frame photographing is carried out with the same lens position. The subsequent photographing is carried out so long as the switch SW2 is on.

In the servo mode, the release operation is permitted any time. Thus, the photographing is carried out as soon as the switch SW2 is turned on. After the focus adjustment is effected once in the AF control routine, the release operation is again permitted and the photographing is carried out. Thus, while SW2 is on, the release operation and the AF control are alternately repeated. This is called an AF continuous photographing. In order to recognize this situation in the AF control routine, a flag RLS is set to "1" after the release operation in the AE control subroutine.

As described above, when the AE control subroutine is completed in the step (005), the AF control subroutine of the step (006) is carried out.

FIG. 4B shows a flow chart of the AF control subroutine. In a step (102), the AF mode is detected by detecting the status of the AF mode set switch (not shown) by communicating with the switch sensing circuit DDR, as is done in the detection of the status of the switch SW1.

If the AF mode is one-shot mode, the process proceeds to a step (103) where a status of a flag JF is detected. The flag JF represents the in-focus state and is set in a decision subroutine of a step (130). The examination of the flag JF in the step 103 means the examination of the previous in-focus state. If the flag JF is "1", it means that the lens was previously in focus, and the process proceeds to a step (104) where the AF control subroutine is returned. In the one-shot mode, once the in-focus state is attained, the switch SW1 is turned off and new AF control is not carried out until all flags are cleared in the step (004). In the first AF control after the turn-on of the switch SW1, the flag JF is in the clear state and the process proceeds to a step (108).

In the step (102), if the servo mode is detected, the process proceeds to a step (105).

In the step (105), the status of the flag RLS is detected. The flag RLS is set in the AE control subroutine. It is set after the release operation. If the flag RLS is "1" in the step (105), it is determined that the timing is immediately after the release in the servo mode, that is, in the AF continuous photographing mode, and the process proceeds to a step (106).

If the AF continuous photographing mode is detected, all flags are cleared in the step (106), a flag FAF is set to "1" in a step (107), and the process proceeds to a step (129). Since the release operation is permitted any time in the servo mode, the program may be jumped to the release operation routine by interruption from any step of the program. Thus, all flags are cleared in the step (106) in order to prevent the influence of the step being executed immediately before the branch by the release interruption. The flag FAF identifies the continuous photographing AF in the AF control subroutine.

In the step (105), if the flag RLS is "0", the process proceeds to a step (108).

In the step (108), a status of a flag PRMV is detected. The flag PRMV relates to the lens control and it is set to "1" when the lens was driven in the previous AF control. Since it is now the first flow from the turn-on of the switch SW1, the flag PRMV is "0", and the process proceeds to a step (112).

In the step (112), a status of a flag SRMV is detected. The flag SRMV also relates to the lens control. Since SRMV is now "0", the process proceeds to a step (129).

Figure 4C:
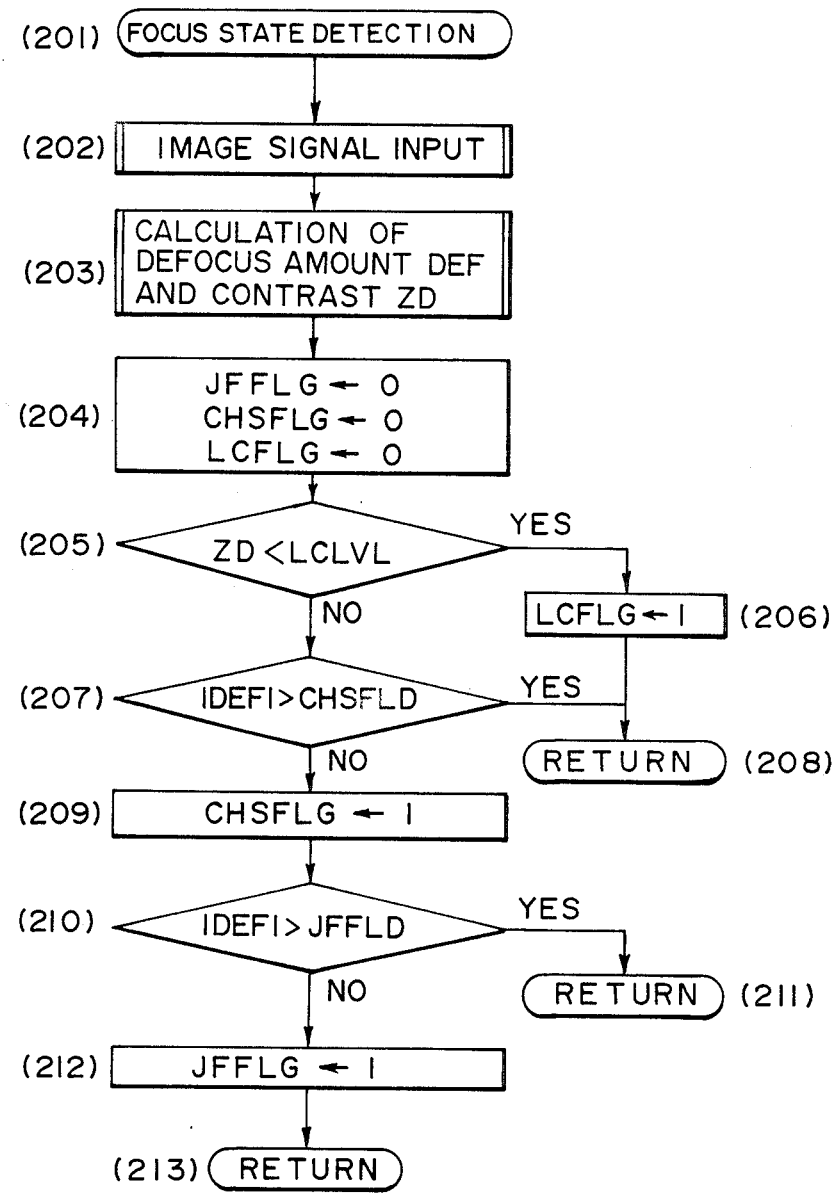

In the step (129), a focus state detection subroutine is carried out. A flow chart of this subroutine is shown in FIG. 4C. The focus state of the imaging lens is detected in this subroutine.

Figure 4D:
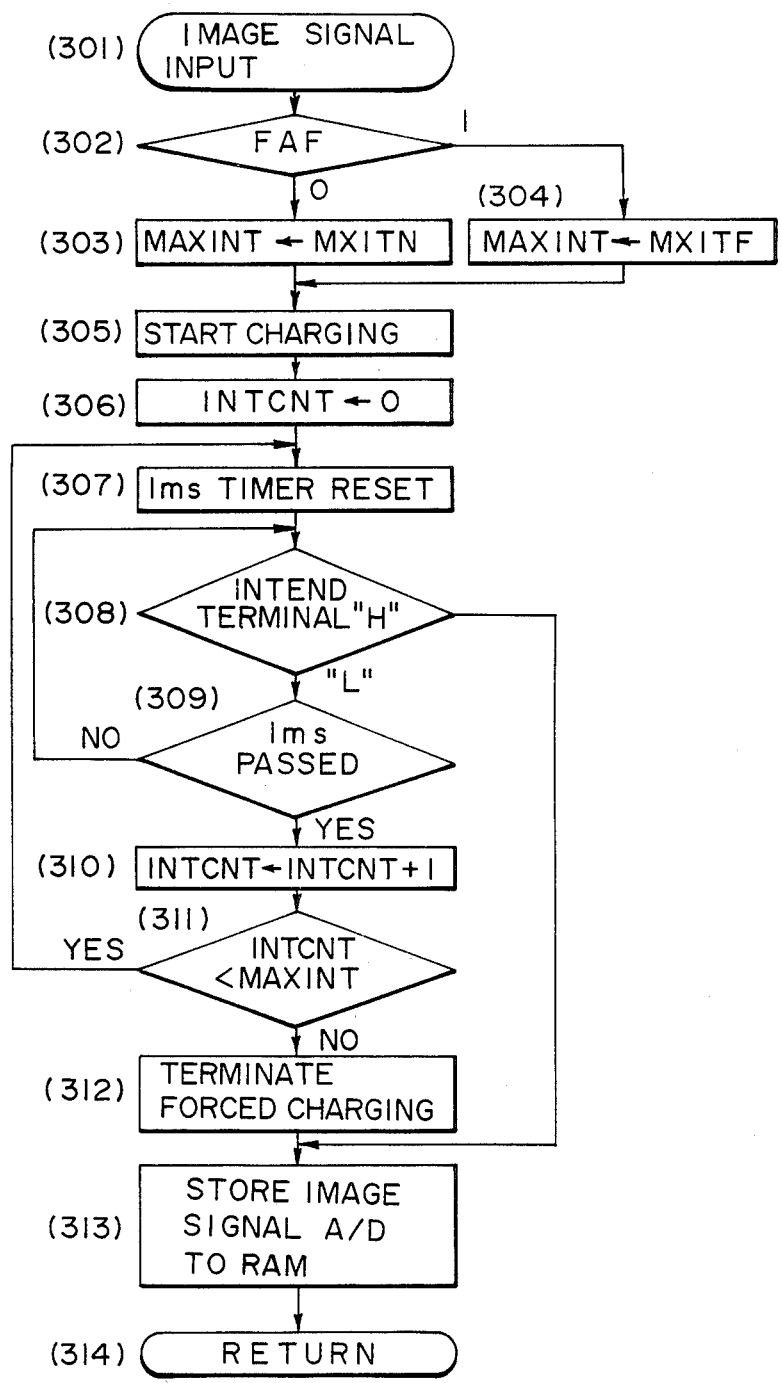
Figure 4E:
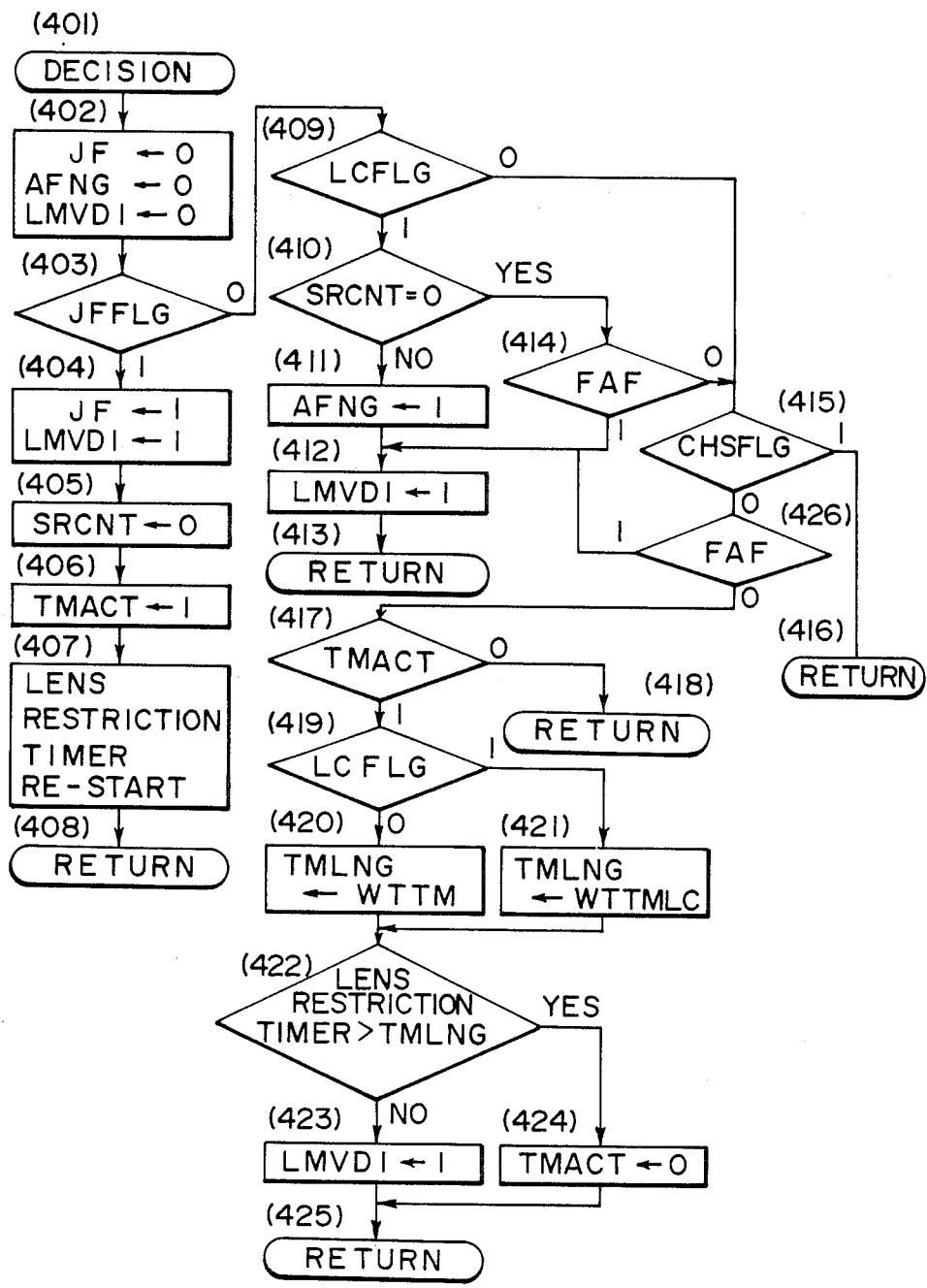

In the next step (130), a decision subroutine is carried out. A flow chart of this subroutine is shown in FIG. 4E. The decision subroutine decides whether the in-focus state has been attained or the focus state detection is disable based on the result of the focus state detection subroutine, and if the lens drive is not necessary, it sets a lens drive inhibit flag LMVDI to "1".

In the next step (131), a display subroutine is carried out to display the in-focus state or the disability to detect the focus state. Predetermined data is sent to the display circuit DDR as is done for the switch SW1, to display it on the display device DSP. Since this operation is not directly related to the present invention, further explanation is omitted.

In a step (132), the status of the flag LMVDI is detected. As described above, when the lens drive is not required, the fag LMVDI is "1". Thus, if LMVDI is "1" in the step (132), the process proceeds to a step (133) where the AF control subroutine is returned. If the flag LMVDI is "0", the process proceeds to a step (134) where a status of a flag LCFLG is detected.

The flag LCFLG is a low contrast flag which is set in a focus state detection subroutine of a step (129). It is set to "1" when a contrast of an image signal is lower than a predetermined level. If LCFLG is "0" in the step (134), it means that the contrast is sufficiently high to detect the focus state. Thus, the lens drive is effected in a step (135), a lens drive flag PRMV is set to "1" in a step (136), and the AF control subroutine is returned in a step (137).

If LCFLG is "1" in the step (134), it means that the contrast is low, and the process proceeds to a step (138).

The steps starting from the step 138 are first control flow of the search operation.

In the step (138), communication is made with the lens to receive from the control unit LPRS in the lens a count FCNT of a distance ring counter which counts the movement of the focus adjustment lens as the output pulse from the encoder ENC linked to the lens. The counter is reset to "0" when the lens power supply VL is turned on, and counts up the pulses when the lens is driven out and counts down the pulses when the lens is driven in.

A relative position of the focus adjusting lens in the optical axis direction in the lens system can be determined by the count FCNT of the distance ring counter.

In the next step (139), the count FCNT is stored into a conversion area LPOS on the PAM of the microcomputer PRS. The count represents the relative position of the lens at the start of the search operation. As will be explained later, if the search operation fails to detect an object having a sufficiently high contrast, the count is used to return the lens to the lens position which was at the start of search operation.

In the next step (140), a command to drive in a near distance direction is issued to the lens and it is informed to the circuit LPRS through the circuit LCM so that the search operation is started. When the lens receives the command, it drives the focus adjusting lens in the near distance direction. For the command to drive in the near distance direction, the circuit LPRS renders LMF to "H" to drive the motor LMTR forwardly and drive the lens in the near distance direction, and for the command to drive in the infinite direction, the circuit LPRS renders LMR to "H" to drive the motor backwardly and drive the lens in the infinite direction. This command does not specify the drive distance but specifies only the drive direction. When the focus adjusting lens reaches a mechanical limit position at the near distance end, the control circuit LPRS in the lens detects it to stop the drive of the lens. If the encoder pulse SENC is not generated for more than a predetermined time period in spite of the issuance of the lens drive command, it is determined that the focus adjusting lens has reached the mechanical limit position, and the lens drive is stopped. In a step (141), a variable SRCNT and a flag SRMV are set to "1". The variable SRCNT represents a status of the search operation. It is set to "0" when no search operation is carried out, to "1" when the lens is driven in the near distance direction, set to "2" when the lens is driven in the infinite direction, and to "3" when the lens is driven toward the start position of the search. Since the lens has now been driven in the near distance direction, the variable SRCNT is set to "1". The flag SRMV represents the lens drive in the search operation. First control of the search operation is effected in steps (138)–(141), and the AF control subroutine is returned in a step (142).

In the first AF control subroutine after the turn-on of the switch SW1, based on the focus state determined in the steps (129) and (130) without regard to whether it is in the one-shot mode or the servo mode, the lens is not driven and the AF control is immediately returned if the in-focus state is detected, the lens is driven in the in-focus direction in accordance with the defocus amount of the lens in the step 135 and the AF control is returned if the defocus state and defocus amount are detected, and the lens is driven in the near distance direction, the search operation is carried out and then the AF control is returned if the low contrast is detected.

In FIG. 4A, when the AF control subroutine of the step (006) is completed, the status of the switch SW1 is again detected in the step (002). If the switch SW1 is not off, a command to stop the drive is issued to the lens in the step (003). Even if any lens drive command has been issued in the previous AF control subroutine, the lens drive is stopped when the switch SW1 is turned off. In the next step (004), all flags are cleared.

If the switch SW1 is kept on in the step (002), the AE control subroutine is again carried out in the step (006) after the AE control subroutine of the step (005) has been carried out.

The flow of second or subsequent AF control subroutine after the turn-on of the switch SW1 is explained below.

When the contrast was not low (flag LCFLG is "0") and the lens was driven (flag PRMV is "1") in the past AF control subroutine, that is, when the lens was driven from a defocus position toward an in-focus position, the flow is as follows.

When the AF control subroutine is carried out, the mode is examined in the step (102). Since the defocus state was previously detected and the flag JF is "0", and the switch SW2 has not been turned on and the release operation has not been carried out, the process proceeds to the step (108) whether the mode is one-shot mode or servo mode. In the step (108), the status of the flag PRMV is detected and the process proceeds to the step (109). In the step (109), the computer PRS renders CLCM to "H", which is informed to the circuit LPRS through the circuit LCM. The circuit LPRS communicates with the lens and receives the information of the lens drive state from the control circuit LPRS in the lens. The control circuit counts the pulses from the encoder ENC by the counter, and when the count matches with the number of pulses corresponding to the defocus amount determined in the focus state detection subroutine, the control circuit renders the signals LMF and LMR to "L" to stop the motor LMTR and stop the lens drive. When the control of the lens drive in accordance with the defocus amount is completed, a lens stop signal is generated internally. In the step (109), the lens stop signal is applied to the computer PRS to determine if the lens has been driven by the defocus amount. If the drive has been completed and the lens has been stopped, the process proceeds to the step (110) where the flag PRMV is cleared. Then, a new focus adjusting operation in the steps (129) et al is started. If the lens has not yet been stopped, the process proceeds to the step (111) where the AF control subroutine is returned. Thus, no new focus adjustment operation is carried out until the drive commanded to the lens in the past AF control step (135) is completed. When the lens drive is completed, the new focus adjustment operation in the steps (129) et al is carried out. If it is determined that the lens has been driven to the in-focus state by the previous lens drive, in the steps (129) and (130) of the new focus adjustment operation, the flags JF and LMVDI are set to "1", the AF control subroutine is returned and the lens is maintained at the in-focus position. After the AF control subroutine has been returned, the process again proceeds to the step (006). When the AF control subroutine is carried out, the "1" flag JF is detected in the step (103) if it is in the one-shot mode. Thus, even if the AF control subroutine is repeated thereafter, the focus state detection and decision are not carried out and the lens is maintained at the in-focus position. In the servo mode, each time the AF control is carried out, the step following to the steps (105), (108), (112) and (129) is repeated so that the lens is driven to the in-focus position in compliance with the movement of the object. In this manner, so long as the low contrast is not detected in the focus status detection and decision subroutine of each AF control subroutine during the repetition of the steps (005) and (006) and the AF control subroutine while the switch SW1 is kept on, ① the lens drive based on the defocus amount when the defocus state is detected →② the detection of the defocus amount after the lens drive, the detection of the in-focus state and the detection of the focus state such as the detection of the low contrast are repeated. In the one-shot mode, after the in-focus state has been detected in the repetition of ① and ②, the repetition of ① and ② is stopped and the lens is maintained at the in-focus position. In the servo mode, the operations ① and ② are repeated and if the object moves after the in-focus state has been detected and the defocus state is now detected, the lens is moved by the operation ① until the in-focus state is detected by the operation ② and thereafter those operations are repeated so that the lens is driven to the in-focus position in compliance with the movement of the object.

When the contrast was low in the previous AF control subroutine (flag LCFLG is "1") and the search operation is carried out (flag SRMV is "1"), the flow is as follows.

When the AF control subroutine is again carried out after the search operation, the status of the flag SRMV is detected in the step (112), and the process proceeds to the step (113).

In the step (113), the information on the lens drive status is received from the lens, and if the lens has been stopped, the process proceeds to the step (119), and if the lens is being driven, the process proceeds to the step (114).

As described in the step (109), the control circuit LPRS forms the lens stop signal when the lens drive by the defocus amount is carried out, but the defocus amount information is not given to the lens for the drive in the near distance direction or the infinite direction in the search operation. On the other hand, when the lens has reached the near distance end or the infinite end, the encoder ENC does not generate the pulse in spite of the lens drive command. Under this condition, the lens stop signal is formed in the control circuit LPRS. Accordingly, in the step (113), the lens stop signal is detected in the same manner as in the step (109), and a branch to the step (119) or the step (114) is effected.

As described above, the search operation

① drives the lens in the near distance direction (variable SRCNT="1")

② drives the lens in the infinite direction if an object of a high contrast is not detected during the drive of ① and the focus adjusting lens reaches the mechanical limit position at the near distance end (variable SRCNT="2"), and ③ drives the lens to the search start position if the object of the high contrast not detected in the drive of ② and the focus adjusting lens reaches the mechanical limit position at the infinite end (variable SRCNT="3").

When the lens is being driven, the focus status detection subroutine is carried out in the step (114). In this subroutine, the defocus amount of the object and the contrast are detected. In the step (115) the status of the low contrast flag LCFLG is detected. If LCFLG is "1" indicating the low contrast, the AF control subroutine is returned in the step 117. In the search operation, the focus state is detected during the lens drive, and if the low contrast is detected, the lens is kept driven. If the flag LCFLG is "0" indicating the non-low·contrast in the focus state detection during the lens drive, the process proceeds to the step (116) where the command to stop the drive is issued to the lens to render LMR and LMF to "L" to stop the drive of the lens. In the step (118), the flag SRMV is cleared and a new focus adjust control is carried out in the step (129). If a non-low contrast, that is, a sufficiently high contrast to permit the detection of the focus state is detected in the focus state detection in the search operation, the lens is stopped and the search operation is terminated (SRMV is "0") and the new focus adjustment in the steps (129) et al is carried out to drive the lens to the in-focus position. If the high contrast is not detected while the lens is driven in the near distance direction in the operation ①, the AF control subroutine is returned in the step (117) each time the AF control subroutine is carried out, until the focus adjustment lens reaches the mechanical limit position at the near distance end.

When the lens drive in the near distance direction continues while the high contrast is not detected and the lens finally reaches the near distance end, the stop of the lens is detected in the step (113), and the process proceeds to the step (119). Since the operation ① is now being carried out, the process proceeds to the step (120). If the operation ② is being carried out, the process proceeds from the step (119) to the step (123), and to the step (124). If the operation ③ is being carried out, the process proceeds to the step (118) to terminate the search operation. The operations ② and ③ will be explained later. In the step (120), the variable SRCNT is incremented by one so that the lens which has reached the near distance end is driven in the infinite direction. In the next step (121), the command to drive in the infinite direction is issued to the lens and it is informed to the lens as was done for the command to drive in the near distance direction. Thus, the lens is driven in the infinite direction and the search operation ② is started. In the step (122), the AF control subroutine is returned. During the operation ②, the steps (113) and (115) are repeatedly carried out until the lens reaches the infinite end. If the high contrast is not detected, the process returns in the step (117) each time the AF control subroutine is carried out, as did in the operation ①. When the high contrast is detected during the drive in the infinite end, the steps (116) and (118) are carried out as were done for the operation ①, and thereafter the lens is driven to the in-focus position in the steps (129) et al.

When the low contrast state is held in the operation ② and the focus adjusting lens reaches the mechanical limit position at the infinite end, the stop of lens is detected in the step (113) and the process proceeds to the step (123) through the step (119). Since the search operation is now ②, SRCNT is "2" and the process proceeds from the step (123) to the step (124). In the step (124), the variable SRCNT is incremented by one so that SRCNT is now "3". Thus, the search operation ③ is started.

In the step (125), the distance ring count FCNT is received, and in the step (126), the value LPOS - FCNT is set into the variable FP. The variable LPOS contains the count of the distance ring counter which represents the lens position in the search operation, and FCNT in the step (125) represents a current count of the lens position at the end of the operation ②. FP which is a difference between LPOS and the current count represents the distance ring count from the current lens position to the search start position. FP is sent to the lens control driver LPOS in the step (127) to command the lens drive by FP of the distance ring count. The circuit LPOS detects the drive distance of the lens by the pulses supplied from the encoder ENC in accordance with FP as is done in the lens drive control based on the defocus amount, drives the lens by the distance corresponding to FP to drive the lens to the search start position. In the step 128, the AF control subroutine is returned. The control in the lens drive based on FP in the search operation ③ is same as those of the operations ① and ②. If the sufficiently high contrast is detected during the access to the search start position, the lens drive is stopped and the normal focus adjustment operation is started in the step (129). If the high contrast is not detected during the operation ③ and the focus adjusting lens reaches the search start position, the stop of the lens drive is detected in the step (113), the process proceeds to the steps (119) and (123), and the flag SRMV is cleared in the step (118) to terminate the search operation, and a new focus adjusting operation is started in the step (129).

The AF continuous photographing operation in which the AF mode is servo mode and the switch SW2 is kept on is explained. As described above, the release flag RLS is set to "1" in the AE control subroutine. Accordingly, in the AF control subroutine which is carried out after the exposure in the release operation, the status of the flag RLS is detected in the step (105), and the process proceeds to the step (106). In the step (106), all flags are cleared and the conditions of the past AF control are initialized. In the next step (107), the AF continuous photographing flag FAF is set to "1", and the process proceeds to the step (129) where the focus adjusting operation is carried out. In the AF continuous photographing operation, the states of the flags PRMV and SRMV relating to the lens drive and the search operation are not detected. The reason therefor and the lens drive inherent to the AF continuous photographing operation are explained in the lens drive subroutine.

The flow of the AF control subroutine is summarized below. When the AF control subroutine is carried out from the camera main routine, the focus state is detected, and if the contrast is not low, the lens is driven in accordance with the defocus amount, and no new focus adjustment operation is carried out until the lens completes a predetermined amount of drive. If the low contrast is detected, the search operation is started. The lens is first driven in the near distance direction. The focus state is detected during the drive of the lens, and if the high contrast object is detected, the lens drive is stopped and the focus adjusting operation is carried out while the lens drive is stopped. If the high contrast is not detected and the lens reaches the near distance end, the lens is now driven in the infinite direction. When the lens reaches the infinite end, the lens is then driven to the search start position. If the high contrast is detected during the lens drive, the lens is stopped and the new focus adjusting operation is carried out. When the lens reaches the search start position while the high contrast is not detected, the search operation is terminated.

FIG. 4C shows a flow chart of the focus state detection subroutine.

In a step (202), an image signal input subroutine is carried out to store an image signal from the sensor SNS into a predetermined area in the microcomputer. A flow chart of the image signal input subroutine is shown in FIG. 4D and will be explained later.

In a step (203), a defocus amount DEF of the imaging lens and a contrast ZD are calculated based on the stored image signal. A specific method is disclosed in Japanese Patent Application No. 160824/1986 filed by the assignee of the present invention and hence detailed explanation thereof is omitted.

In a step (204), three flags JFFLG, CHSFLG and LCFLG are cleared. In a step (205), the contrast ZD is compared with a predetermined level LCLVL, and if ZD<LCLVL, the process proceeds to a step (206) where the flag LCFLG is set to "1". Namely, if the contrast ZD is lower than the predetermined level LCLVL, the low contrast flag LCFLG is set to "1". In a step (208), the focus state detection subroutine is returned. In the step (205), if ZD≧LCLVL, the process proceeds to a step (207) where the absolute value of the defocus amount DEF is compared with a predetermined level CHSFLD. If |DEF|>CHSFLD, the process proceeds to the step (208) where the focus state detection subroutine is returned.

In the step (207), if |DEF|≦CHSFLD, the process proceeds to a step (209) where a flag CHSFLG is set to "1". Namely, if the contrast is sufficiently high and the defocus amount is within the near in-focus range represented by CHSFLD, the near in-focus flag CHSFLG is set to "1".

In a step (210), |DEF| is compared with a predetermined level JFFLD (where JFFLD<CHSFLD), and if |DEF|>JFSFLD, the process proceeds to a step (211) where the focus state detection subroutine is returned. If |DEF|≦JFSFLD, the flag JFFLG is set to "1" in a step (212), and the focus state detection subroutine is returned in a step (213). Namely, if the defocus amount is within the in-focus range represented by JFFLD, the in-focus flag JFFLG is set to "1".

In the focus state detection subroutine, the defocus amount of the imaging lens and the contrast are detected, and if the contrast is low, the low contrast flag LCFLG is set to "1", and if the contrast is sufficiently high, the flag is cleared to "0". If the defocus amount is within the near in-focus range, the flag CHSFLG is set to "1", and if it is in the in-focus range, the flag JFFLG is set to "1". Then, the focus state detection subroutine is returned.

FIG. 4D shows a flow chart of the image signal input subroutine.

When the image signal input subroutine is carried out, a status of an AF continuous photographing flag FAF is detected in a step (302). If FAF is "1", a predetermined value MXITF is set into a variable MAXINT in a step (304), and if FAF is "0", a predetermined value MXITN is set into the variable MAXINT in a step (303). The variable MAXINT define a longest charge time of the sensor, and MXITN>MXITF. Accordingly, the longest charge time is set shorter for the AF continuous photographing.

In the next step (305), the charge of optical image to the sensor SNS is started. Specifically, the microcomputer PRS sends a charge start command to the sensor driver SDR which renders the clear signal CLR of the photo-electric converter of the sensor SNS to "L" to start the charging of electricity.

In a step (306), a charge time counter INTCNT on the RAM is initialized to "0". In a step (307), a one-millisecond timer is reset and time counting is started from the reset state. The one-millisecond timer utilizes a timer function of the microcomputer PRS.

In a step (308), a status of an input terminal INTEND of PRS is detected to examine whether the charging has been completed or not. The sensor driver SDR renders the signal INTEND to "L" when the charging is started, monitors a signal SAGC from SNS, and when SAGC reaches a predetermined level, it renders the signal INTEND to "H" and renders a charge transfer signal SH to "H" for a predetermined time to transfer the charge of the photoelectric converter to the CCD.

If the terminal INTEND is "H" in the step (308), it means that the charging has been completed, and the process proceeds to a step (313). If INTEND is "L", it means that the charging has not been completed, and the process proceeds to a step (309). If the charging has not been completed, whether the one-millisecond timer reset in the step (309) has timed out the one millisecond or not. If it has not timed out the one millisecond, the process proceeds to the step (308) where the completion of the charging or the elapse of one millisecod is monitored. If one millisecond elapses before the completion of the charging, the process proceeds to a step (310). In the step (310), a charge time counter INTCNT is incremented by one, and the process proceeds to a step (311). In the step (311), the counter INTCNT is compared with the variable MAXINT which is the longest charge time represented in millisecond. If INTCNT is smaller than MAXINT, the process returns to the step (307) where the completion of the charging is again monitored. If INTCNT is equal to MAXINT, the process proceeds to a step (312) where the charging is forcibly terminated. The forced termination of the charging is effected by sending a charge terminate command from the microcomputer PRS to the sensor driver SDR. When the charge terminate command is sent from PRS, SDR renders the charge transfer signal SH to "H" for a predetermined time to transfer the charge of the photoelectric converter to CCD. The charging of the sensor is completed by the flow ending at the step (312). When the charging is completed in the longest time MAXINT from the start of charging in the steps (305)–(311), the process proceeds to a step (313). When the charging is not completed in that time, the charging is forcibly terminated after that time and the process proceeds to the step (313).

In the step (313), a signal AOS derived by amplifying the image signal OS of the sensor SNS by the sensor driver SDR is A/D converted and the resulting digital signal is stored in the RAM. More specifically, SDR generates CCD driving clocks $\phi 1$ and $\phi 2$ in synchronism with the clock CK from the PRS and supplies them to a control circuit SSCNT in SNS, and the CCD is driven by $\phi 1$ and $\phi 2$. The charge in the CCD is time-serially outputted from the output OS as the image signal. This signal is amplified by the amplifier in SDR and the amplified signal is applied to the analog input terminal of PRS as AOS. PRS A/D converts it in synchronism with the clock CK which PRS outputs, and stores the resulting digital signal in the predetermined addresses of the RAM. When the image signal has been inputted, the image signal input subroutine is returned in a step (314). FIG. 4E shows a flow chart of the decision subroutine.

In a step (402), three flags JF, AFNG and LMVDI are cleared. The flag JF represents an in-focus state, the flag AFNG represents disability of focus state detection, and the flag LMVDI represents inhibition of the lens drive.

In a step (403), a status of an in-focus area flag JFFLG which is set in the focus state detection subroutine is detected. If it is "1", it means the in-focus state and the process proceeds to a step (404). In the step (404) which is an in-focus state control step, the in-focus flag JF and the lens drive inhibit flag LMVDI are set to "1". In a step (405), a constant SRCNT is cleared. As described above, SRCNT="0" means no search operation. If the in-focus state is attained, the operation is similar to no search operation. If the contrast becomes low, the search operation is again carried out. In a step (406), a flag TMACT is set to "1". The flag TMACT will be explained later. It is a flag to represent that a lens drive restriction timer is in operation. In a step (407), the timer is started, and in a step (408), the decision subroutine is returned. The lens drive restriction timer utilizes an internal timer of the microcomputer PRS. It starts counting from the restart and can read the count any time.

If the in-focus area flag JFFLG is "0" in the step (403), the process proceeds to a step (409) where the status of the low contrast flag LCFLG which is set in the focus state detection subroutine is detected. If the flag LCFLG is "1" in the step (409), it means that the focus state detection resulted in the low contrast, and the process proceeds to a step (410).

In the step (410), a status of a search operation variable SRCNT is detected. If it is not "0", the process proceeds to a step (411). The fact that the variable SRCNT is not "0" means that the search operation has been carried out after the switch SW1 was turned on. In this case, a focus state detection disable flag AFNG is set to "1" in a step (411) to prevent the search operation from being carried out again, and a lens drive inhibit flag LMVDI is set to "1" in a step (412). If the flag LMVDI is "1", the process proceeds to the step (133) in the step (132) of the AF control subroutine of FIG. 4B so that the AF control is returned. Accordingly, the search operation in the steps 138 et al is not carried out.

In the step (410), if the variable SRCNT is "0", the process proceeds to a step (414) where a status of a continuous photographing AF flag FAF is detected.

In the step (414), if the flag FAF is "1", that is, if continuous photographing AF, the process proceeds to the step (412) where the flag LMVDI is set to "1" to prevent the search operation from being carried out. When the flag FAF is "0", the process proceeds to a step (415) and the AF control subroutine is carried out.

The search operation is carried out when the low contrast is detected in the focus state detection subroutine in the step (129) of the AF control subroutine and the flag LCFLG is set to "1". If the flag LMVDI is "1" in the immediately prior step (132), the search operation in the steps (138) et al is not carried out, and the search operation is not carried out even if the low contrast is not detected in the step (129).

When the low contrast is detected in the focus state detection subroutine in the step (129) of the decision subroutine, the flag LMVDI is set to "1" if SRCNT≠"0" is detected in the step (410) or the AF continuous photographing mode is detected in the step (414) when SRCNT="0". Under this condition, the search operation is not carried out even if the low contrast is detected in the step (129).

SRCNT≠0 if the search operation has been previously carried out. Accordingly, if the search operation has been previously carried out and the low contrast is detected in the subsequent AF control subroutine, the process proceeds from the step (132) to a step (133), and the AF control subroutine is returned. Accordingly, the search operation is carried out only once.

SRCNT=0 if the in-focus state is detected in the decision subroutine. If the low contrast is detected in the step (129) in the subsequent AF control subroutine, the search operation is carried out even if the search operation has been previously carried out. In the AF continuous photographing mode, the search operation is not carried out even if the low contrast is detected in the step (129) so that loss of shutter chance because of the search operation during the AF continuous photographing mode is prevented.

Accordingly, the search operation is carried out when the low contrast is detected in the non-AF continuous photographing mode, and even if the low contrast is again detected in the subsequent AF control subroutine, the search operation is not carried out unless the in-focus state has been detected after the previous search operation, and the search operation is permitted on the condition of the in-focus state.

If the low contrast flag LCFLG is "0", that is, if the contrast is sufficiently high in the step (409) of the decision subroutine, the process proceeds to a step (415).

In a step (426), the continuous photographing AF flag FAF is detected. If the flag FAF is "1" indicating the continuous photographing AF mode, the process proceeds to the step (412), and if not, the process proceeds to a step (417). Namely, if the continuous photographing mode is detected in the non-near in-focus state, the process proceeds to the step (412) to inhibit the lens drive based on the defocus amount. In the continuous photographing AF mode, any lens drive is inhibited when the contrast is low, and the lens drive is also inhibited if the defocus amount is large even if the contrast is sufficiently high, and the lens drive is permitted only when the lens drive time to the in-focus state is short. Accordingly, a release interval in the continuous photographing mode is shortened and a condition suitable for the continuous photographing mode can be provided.

In a step (417), a status of a lens drive restriction① timer flag is detected. If it is "0" indicating no operation, the process proceeds to a step (418) where the decision subroutine is returned. If TMACT is "1" indicating in-operation, the process proceeds to a step (419) where the lens drive restriction timer is controlled. In the step (419), the status of the low contrast flag LCFLG is detected. If it is "1", the process proceeds to the step (412) where a predetermined variable WTTMLC is set to the variable TMLNG. If the flag LCFLG is "0", the process proceeds to a step (420) where a predetermined constant WTTM is set to the variable TMLNG which defines a work time of the lens drive restriction timer. the constant WTTM is smaller than the constant WTTMLC. When the lens drive restriction timer which starts to time upon in-focus state is smaller than TMLNG, the lens drive based on the defocus amount is inhibited, and when it exceeds TMLNG, the lens drive is permitted. When the focus state detection shows the low contrast, the time from the in-focus state to the search operation is longer than the time to the start of the lens drive under non-low contrast.

In a step (422), the count of the lens drive restriction timer is compared with the variable TMLNG, when the former is larger, the process proceeds to a step (424) where the lens drive restriction timer flag TMACT is cleared and the decision subroutine is returned. If the latter is larger in the step (422), the process proceeds to a step (423) where the lens drive inhibit flag is set to "1". In a step (425), the decision subroutine is returned.

In the steps (415)–(426), when small defocus amount is detected in the AF continuous photographing mode, the lens is immediately driven, and in other cases, the lens drive is inhibited. In the non-AF continuous photographing mode, when the small defocus amount is detected, the lens is immediately driven, and when a large defocus amount is detected, the lens is immediately driven if the in-focus state has not been detected or WTTM time has elapsed since the detection of the in-focus state. The lens drive is inhibited within the WTTM time since the detection of the in-focus state even if the large defocus amount is detected, and the lens is driven if the large defocus amount is detected after the WTTM time has elapsed.

In the search operation, the lens is immediately driven if the in-focus state has not been detected, and in the search operation after the in-focus state has been detected, the lens drive is inhibited until WTTMLC time which is longer than the WTTM time elapses after the in-focus state has been attained. Thus, even if the lens is moved away from the object and a low contrast is detected after the in-focus state has been detected, the search operation is not carried out if the lens is returned to the object within the above time, and loss of shutter chance by unnecessary search operation is prevented.

The reason for inhibiting the lens drive within the timer time since the in-focus state for the large defocus amount is same as above. The timer time is set shorter than that of the search operation in order to make a condition to move to the search severer because the lens is driven longer than when the large defocus amount is detected if the search operation is carried out. The defocus amount usually varies in a small amount and the small defocus amount is normally detected in the in-focus state. Thus, in the servo mode, it is necessary to follow the variation. This is the reason why the lens is immediately driven for the large or small defocus amount. The large defocus amount after the in-focus state may be detected when the lens is moved away from the object. Accordingly, the lens drive is inhibited within the timer time.

In the continuous photographing AF mode, the search operation is inhibited. Thus, LMVDI is set to "1".

When the mode is not in the continuous photographing mode and the low contrast is detected without prior in-focus state detection during the repetition of the AF control subroutine, or when the low contrast is detected after the in-focus state has been detected after one search operation, the search operation is carried out. If the detected defocus amount is smaller than a predetermined amount in the repetitive focus detection decision operation and the lens drive, the lens is immediately driven. If the detected defocus amount is larger than the predetermined amount and the lens drive restriction time is in operation after the previous in-focus state, that is, when a predetermined time has not yet been elapsed since the in-focus state, the lens is driven after that time has been elapsed.

In the lens drive in the search operation, the lens is driven after a predetermined time longer than the predetermined time has elapsed since the in-focus state.

The decision subroutine and the overall flow described above are summarized as follows.

In the repetitive operation of the AE control subroutine and the AF control subroutine after the turn-on of the switch SW1, if the defocus amount detected by the focus state detection is larger than the near in-focus range, the lens is driven in accordance with the defocus amount, and after the lens drive, the focus state is again detected and the decision is made. If the in-focus state is not detected, the lens drive in accordance with the detected defocus amount and the focus state detection are carried out until the in-focus state is detected, and when the in-focus state is detected, the in-focus flag JF is set to "1" and the lens drive inhibit flag LMVDI is set to "1". The lens drive restriction timer is activated. If the mode is one-shot mode, the focus state detection and the lens drive are not carried out in the subsequent AF control subroutine, and the lens is maintained at the in-focus state.

In the servo mode, the focus state detection and the lens drive are carried out even after the in-focus state has been attained and the lens is always moved to the in-focus state to follow the movement of the object.

When the low contrast is detected in the AF control subroutine, the search operation is carried out. Even when the low contrast is detected, if the in-focus state is not detected after the search operation has been carried out, LMVDI is set to "1" so that the search operation is not carried out when the low contrast is detected.

For the image signal charge time in the focus state detection, the longest charge time is set shorter in accordance with the normal AF in the continuous photographing AF mode so that the AF operation time is shortened as much as possible and the shutter release operation interval is shortened.

In the AF continuous mode, the lens drive is permitted only when the contrast is sufficiently high and the small defocus amount is detected.

Figure 4F:
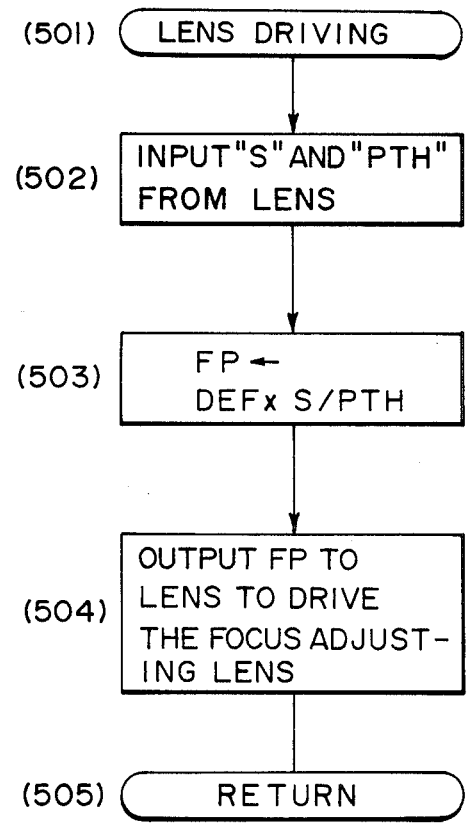

FIG. 4F shows a flow chart of the lens drive subroutine.

In this subroutine, communication is made with the lens in a step (502) to receive two data S and PTH. The data S is a coefficient of defocus amount versus focus adjusting lens drive distance. For a single lens which is to be driven as a whole, S = 1 because the entire imaging lens is the focus adjusting lens. For a zoom lens, S varies depending on a zoom position. The data PTH is a focus adjusting lens drive distance per output pulse of the encoder ENC linked to the movement in the optical axis of the focus adjusting lens LNS. Those data are stored in a memory in the circuit LPRS and supplied to the computer through the communication between the computer and the circuit LPRS.

The number of output pulses of the encoder which represents the drive distance of the focus adjusting lens, that is, the lens drive distance FP is given by the current defocus amount PE of the imaging lens and the data S and PTH as follows.

$$FP = DEF \times S/PTH$$

S step (503) carries out the above operation.

In a step (504), FD calculated in the step (503) is sent to the lens to instruct the drive of the focus adjusting lens (entire imaging lens for the single lens which is to be driven as a whole). In a step (505), the lens drive subroutine is returned.

In the present embodiment, the lens is reciprocated once in the search operation although the lens may be reciprocated several times in one search operation.

While the search operation is again permitted when the in-focus state is attained, it may be permitted when near in-focus state is attained.

In accordance with the present invention, the search operation is permitted when the in-focus or near in-focus state is detected in the focus state detection so that the focus adjustment with improved operability is attained.

What is claimed is:

1. A camera having a focus state detection device for detecting a focus state and driving a focusing optical system toward an in-focus position in accordance with a result of focus state detection and, in a circumstance where the focus state is not detectable, carrying out a search operation to drive the focusing optical system in a predetermined range independently from the result of the focus state detection, comprising:
   (a) a focus state detector for detecting the focus state;
   (b) a driver for driving the focusing optical system in accordance with the result of the focus state detection by said focus state detector;
   (c) a discriminator for determining whether the focus state is detectable or not;
   (d) search control means for supplying a search signal to said driver to start the search operation when said discriminator determines that the focus state is not detectable;
   (e) inhibit means for inhibiting further search operation after the control of the search operation by said search control means; and
   (f) release means for releasing the inhibit of the search operation by said inhibit means when the result of the focus state detection by said focus state detector indicates an in-focus or near in-focus state.

2. A camera according to claim 1 wherein said search control means drives the imaging optical system at least once over an entire drive range thereof.

3. A camera according to claim 1 wherein said focus state detector includes a sensor for sensing an object image through the focusing optical system and a processor for producing a focus signal representing the focus state of the focusing optical system and a contrast signal representing a contrast state of the image in accordance with an image signal representing the object image sensed by said sensor, said driver drives the focusing optical system in accordance with the focus signal, and said discriminator detects the magnitude of the contrast signal to determine whether the focus state is detectable or not.

4. A camera according to claim 3 further comprising a switching circuit for supplying the focus signal to said driver instead of the search signal when said discriminator detects that the focus state is not detectable in the search operation.

5. A camera according to claim 1 further comprising a drive control circuit for inhibiting the drive of the focusing optical system in accordance with the result of the focus state detection by said driver until said discriminator next detects that the focus state is detectable when said discriminator has detected that the focus state was not detectable.

6. A camera according to claim 2 wherein said focus state detector includes a sensor for sensing an object image through the focusing optical system and a processor for producing a focus signal representing the focus state of the focusing optical system and a contrast signal representing a contrast state of the image in accordance with an image signal representing the object image sensed by said sensor, said driver drives the focusing optical system in accordance with the focus signal, and said discriminator detects the magnitude of the contrast signal to determine whether the focus state is detectable or not.

7. A camera according to claim 6 further comprising a switching circuit for supplying the focus signal to said driver instead of the search signal when said discriminator detects that the focus state is not detectable in the search operation.

8. A camera having a detection device comprising:
(a) a focus state detector for detecting a focus state;
(b) a driver having a first mode for driving a focusing optical system into an in-focus state in accordance with a result of focus detection by said focus state detector and a second mode for driving the focusing optical system in a series of movements;
(c) a discriminator for determining whether the focus state is detectable or not;
(d) switch means for switching the mode of said driver from the first mode to the second mode when said discriminator determines that the focus state is not detectable;
(e) inhibit means for inhibiting further drive of the focusing optical system in the second mode after the focusing optical system has been driven in the second mode; and
(f) release means for releasing the inhibition of the focusing optical system in the second mode by said inhibit means and permitting switching of said switch means by the detection of the indetectable state of the focus state by said discriminator when said focus state detector detects an in-focus or near in-focus state while further drive of the focusing optical system in the second mode is inhibited by said inhibit means;

9. A camera according to claim 8 wherein said inhibit means has memory means for storing a signal indicating that the drive in the second mode has been effected when such drive was effected, said switch means inhibits the switching while said memory means stores the signal indicating that the drive in the second mode has been effected, and said release means cancels the signal stored in said memory means when said focus state detector detects an in-focus or near in-focus state.

* * * * *

UNITED STATES PATENT AND TRADEMARK OFFICE
CERTIFICATE OF CORRECTION

PATENT NO. : 4,786,932

DATED : November 22, 1988

INVENTOR(S) : Akira Akashi

It is certified that error appears in the above-identified patent and that said Letters Patent is hereby corrected as shown below:

Title page:

[56] REFERENCES CITED
  Right Column, change "Primary Examiner - W.B. Perky"
    to --Primary Examiner - W.B. Perkey--.

COLUMN 1
  Line 34, change "one," to --once--; and
  Line 39, change "constract" to --contrast--.

COLUMN 6
  Line 53, change "fag LMVDI" to --flag LMVDI--.

COLUMN 11
  Line 46, change "summerized" to --summarized--.

COLUMN 13
  Line 24, change "millisecod" to --millisecond

COLUMN 15
  Line 49, change "restriction ①" to --restriction 1--; and
  Line 62, change "the" to --The--.

UNITED STATES PATENT AND TRADEMARK OFFICE
CERTIFICATE OF CORRECTION

PATENT NO. : 4,786,932

DATED : November 22, 1988

INVENTOR(S) : Akira Akashi

It is certified that error appears in the above-identified patent and that said Letters Patent is hereby corrected as shown below:

<u>Column 20</u>

Line 17, change "means;" to --means.--.

Signed and Sealed this

Third Day of October, 1989

Attest:

DONALD J. QUIGG

Attesting Officer

Commissioner of Patents and Trademarks